(12) United States Patent
Urbanek

(10) Patent No.: US 9,777,808 B2
(45) Date of Patent: Oct. 3, 2017

(54) GUIDING DEVICE FOR A BELT MEANS OF A BELT-DRIVEN CONICAL PULLEY TRANSMISSION

(71) Applicant: Andreas Urbanek, Karlsruhe (DE)

(72) Inventor: Andreas Urbanek, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 190 days.

(21) Appl. No.: 14/187,257

(22) Filed: Feb. 22, 2014

(65) Prior Publication Data

US 2014/0235390 A1 Aug. 21, 2014

Related U.S. Application Data

(63) Continuation of application No. PCT/DE2012/000786, filed on Aug. 3, 2012.

(30) Foreign Application Priority Data

Aug. 24, 2011 (DE) .......................... 10 2011 081 481
Dec. 5, 2011 (DE) .......................... 10 2011 087 763

(51) Int. Cl.
*F16H 7/18* (2006.01)
*F16H 9/16* (2006.01)

(52) U.S. Cl.
CPC ................. *F16H 7/18* (2013.01); *F16H 9/16* (2013.01); *F16H 2007/185* (2013.01)

(58) Field of Classification Search
CPC ........................... F16H 7/18; F16H 2007/185

USPC .................................................. 474/111, 140
See application file for complete search history.

(56) References Cited

U.S. PATENT DOCUMENTS

| 6,036,613 A * | 3/2000 | Diehm ...................... F01L 1/02 474/111 |
| 6,435,994 B1 * | 8/2002 | Friedmann ................ F16H 7/18 474/111 |
| 7,354,364 B2 * | 4/2008 | Glas ......................... F16H 59/36 474/140 |
| 8,057,336 B2 * | 11/2011 | Wodtke ..................... F16H 7/18 474/111 |

(Continued)

FOREIGN PATENT DOCUMENTS

| DE | 100 17 005 A1 | 10/2000 |
| DE | 10 2007 015 677 A1 | 10/2008 |

(Continued)

*Primary Examiner* — William E Dondero
*Assistant Examiner* — Mark K Buse
(74) *Attorney, Agent, or Firm* — Alfred J. Mangels

(57) ABSTRACT

A guiding device for guiding a belt of a belt-driven conical-pulley transmission. The device includes a first guiding section and a second guiding section that is spaced from the first guiding section, and between which the belt is guided in a running direction. The guiding sections have a longitudinal extent that corresponds to the running direction of the belt and a transverse extent that is perpendicular thereto, and lateral edge sections that delimit the guiding sections in the transverse direction. At least one guiding section has at least one longitudinal rib that extends in the longitudinal direction and that is positioned apart from the lateral edge sections in order to improve the guiding device structurally and functionally.

13 Claims, 4 Drawing Sheets

(56) References Cited

U.S. PATENT DOCUMENTS

| | | | | |
|---|---|---|---|---|
| 8,475,307 B2* | 7/2013 | Bodensteiner | ............ | F16H 7/08 474/110 |
| 2002/0004433 A1* | 1/2002 | Fujiwara | ............. | B29C 45/1639 474/111 |
| 2003/0092520 A1* | 5/2003 | Konno | ...................... | F16H 7/18 474/111 |
| 2004/0142792 A1* | 7/2004 | Glas | ........................ | F16H 59/36 477/70 |
| 2005/0277500 A1* | 12/2005 | Bitzer | ................. | F16H 57/0489 474/1 |
| 2009/0036242 A1* | 2/2009 | Hayami | .................... | F16H 7/18 474/111 |
| 2011/0152019 A1* | 6/2011 | Gantner | .................... | F16H 9/24 474/8 |
| 2011/0244999 A1* | 10/2011 | Nakamura | ................ | F16H 9/18 474/91 |

FOREIGN PATENT DOCUMENTS

| | | |
|---|---|---|
| DE | 10 2009 019 069 A1 | 11/2009 |
| JP | 2005282695 A | 10/2005 |
| WO | WO 03/087846 A2 | 10/2003 |
| WO | WO 2007/068229 A1 | 6/2007 |

\* cited by examiner

GUIDING DEVICE FOR A BELT MEANS OF A BELT-DRIVEN CONICAL PULLEY TRANSMISSION

CROSS-REFERENCE TO RELATED APPLICATION

This application is a continuation of International Application Serial No. PCT/DE2012/000786, having an international filing date of 3 Aug. 2012, and designating the United States, the entire contents of which are hereby incorporated by reference to the same extent as if fully rewritten.

BACKGROUND OF THE INVENTION

Field of the Invention

The present invention relates to a guiding device for a belt means of a belt-driven conical-pulley transmission having a first guiding section and a second guiding section that is spaced from the first guiding section and between which the belt means can be guided in one running direction. The guiding sections have a longitudinal direction that corresponds to the running direction of the belt means and have a transverse direction perpendicular thereto, and lateral edge sections that delimit the guiding sections in the transverse direction.

Description of the Related Art

From WO 2007/068229 A1 a guiding arrangement for a belt means is known, having at least one guiding device which includes at least two corresponding guide tongues between which the belt means is at least partially guided, the guide tongues being held at a predetermined distance from each other by means of a connecting region, at which during temperature changes the distance between the guide tongues is approximately constant, due to the use of materials having differing heat expansion coefficients in the guiding device, in order to keep the distance between the guide tongues approximately constant, independent of temperature fluctuations. According to WO 2007/068229 A1, essentially a synthetic material having a high heat expansion coefficient is intended as the material of the guiding device, and at least the connecting region of the guiding device includes at least one element made of a material having a lower heat expansion coefficient, such as a U-shaped metal bow.

An object of the present invention is to structurally and/or functionally improve a guiding device of the type identified at the beginning.

SUMMARY OF THE INVENTION

The object is achieved with a guiding device for a belt means of a belt-driven conical-pulley transmission. The guiding device includes a first guiding section and a second guiding section which is spaced apart from the first guiding section, between which guiding sections the belt means can be guided in one running direction. The guiding sections have a longitudinal direction that corresponds to the running direction of the endless torque-transmitting belt means, and a transverse direction perpendicular thereto, and lateral edge sections which delimit the guiding sections in the transverse direction, wherein at least one guiding section has at least one longitudinal rib which extends in the longitudinal direction, which is positioned spaced from the lateral edge sections.

The transmission ratio of the belt-driven conical-pulley transmission can be continuously adjustable. The belt-driven conical-pulley transmission can be a continuously variable transmission (CVT). The belt-driven conical-pulley transmission can be a variator transmission. The belt-driven conical-pulley transmission can be positioned in a drivetrain of a motor vehicle. The belt-driven conical-pulley transmission can have a first conical pulley and a second conical pulley. The conical pulleys can have parallel axes of rotation. Each pulley can have one axially fixed conical disk and one axially movable conical disk. It can be possible to move the axially movable conical disks of the conical pulleys in opposite directions. It can be possible to drive the first conical pulley by means of an input drive. The input drive can be an internal combustion engine. It can be possible to connect an output drive by means of a second conical pulley. The endless torque-transmitting means can serve to transmit mechanical power between the first conical pulley and the second conical pulley. The belt-driven conical-pulley transmission can have a housing. The conical disks can be supported in the housing.

The belt means can be a traction medium. The belt means can be a chain. The chain can be a plate-link chain. The chain can have plates and pressure members. The pressure members can serve to couple the belt means with the conical pulleys. A coupling between the pressure members and the conical pulleys can occur by frictional engagement. The plates can serve to couple the pressure members. The belt means can have a tight side under tension and a slack side. In operation, vibrations in a transverse direction can be induced on the tight side and/or on the slack side of the belt means. The transverse direction can be a direction that is perpendicular to the running direction of the belt means and perpendicular to the axes of rotation of the conical pulleys. The belt means can have a running position independent of a transmission ratio of the belt-driven conical-pulley transmission. The running position of the belt means can change with a change in the transmission ratio of the belt-driven conical-pulley transmission.

With the guiding device, it can be possible to guide the belt means on a tight side. With the guiding device, it can be possible to guide the belt means on a slack side. It can be possible to guide the belt means at the first guiding section and at the second guiding section in a transverse direction. It can be possible to guide the belt means at least nearly free of clearance between the first guiding section and the second guiding section. The belt means can slip in operation at the first guiding section and/or at the second guiding section. At the first guiding section, it can be possible to guide the belt means by its inner side. An inner side of the belt means can be a side facing the axes of rotation of the conical pulleys. At the second guiding section, it can be possible to guide the belt means by its outer side. An outer side of the belt means can be a side facing away from the axes of rotation of the conical pulleys.

The first guiding section and the second guiding section can be connected to each other by means of a connecting section. The connecting section can be positioned on a lateral edge section of the first guiding section and on a lateral edge section of the second guiding section. The lateral edge sections can delimit the guiding sections in a transverse direction. The first guiding section, the second guiding section, and the connecting section can be produced in a single piece. The connecting section can have reinforcing ribs. The connecting section can have an upper, a lower, and lateral edge sections. The reinforcing ribs can be positioned on at least one edge section of the connecting section. There can be reinforcing ribs positioned between the edge sections of the connecting section. Diagonally-running reinforcing ribs can be positioned between the edge sections of the connecting section. A ring-shaped reinforcing rib can be positioned between the edge sections of the connecting section.

The longitudinal rib can be positioned inwardly of the connecting section in a transverse direction. A transverse direction can be a direction corresponding to the direction of the axes of rotation of the conical pulleys. The longitudinal rib can be at least approximately centered between the edge sections in a transverse direction. The longitudinal rib can be positioned off-center in a transverse direction. The guiding device can be divided in the longitudinal direction into two guiding device halves. The guiding device halves can be connected to each other. The guiding device halves can be connected to each other positively. The guiding device halves can be locked together. A guiding section can be divided in the longitudinal direction into two guiding section halves. Each guiding section half can have edge sections which delimit movement of the belt means in a transverse direction. Each guiding section half can have a longitudinal rib. The longitudinal rib of each guiding section half can be positioned apart from the edge sections of that guiding section half. The longitudinal rib of each guiding section half can be positioned inside in a transverse direction on the guiding section half. The longitudinal rib of each guiding section half can be positioned in a transverse direction at least approximately centered between the edge sections of the guiding section half. The longitudinal rib of each guiding section half can be positioned in a transverse direction, off-center and between the edge sections of the guiding section half.

The guiding device in accordance with the invention has increased stability. Area moment of inertia is increased. Bending stiffness is increased. Inherent stiffness is increased. The guiding device in accordance with the invention makes improved damping of vibrations of the belt means possible. Noise development when the transmission is in operation is reduced. Wear of the belt means is reduced. Additional construction space is not required.

The at least one guiding section can have a guide tongue and an outer panel spaced from the guide tongue, and the longitudinal rib can extend between the guide tongue and the outer panel. The guide tongue and the outer panel can be spaced from each other in a vertical direction of the guiding device. A vertical direction can be a direction that is perpendicular to the running direction of the endless torque-transmitting means and to the axes of rotation of the conical pulleys. A vertical direction can correspond to a transverse direction. The belt means can be guidable by slipping in contact on the surface of the guide tongue. The guide tongue and the outer panel can be positioned at least nearly parallel to each other. The guide tongue and the outer panel can be spaced farther apart from each other in a middle section of the guiding section than at end sections of the guiding section. The guide tongue and the outer panel can merge into each other at end sections of the guiding section. The longitudinal rib can extend between the guide tongue and the outer panel in a vertical direction of the guiding section. The guide tongue, the outer panel, and the longitudinal rib can form a double-T profile-like cross section of the at least one guiding section. Thereby, the at least one guiding section has a high area moment of inertia.

The at least one guiding section can have at least one transverse rib. The transverse rib can extend in a transverse direction of the guiding section. The transverse rib can extend in a vertical direction of the guiding section, thereby achieving an additional increase in stability. A plurality of transverse ribs can be positioned along the at least one guiding section. A plurality of transverse ribs can be distributed in the longitudinal direction of the guiding section. The transverse ribs can be positioned at least approximately at the same distance from each other. The transverse ribs can be distributed at least approximately symmetrically. That achieves an adjusted stability over the length of the guiding section.

The guide tongue, the outer panel, the longitudinal rib and/or the transverse rib(s) can be of an at least approximately equal material thickness. That improves producibility, for example in an injection molding process. The guiding device can be made of a single material. The material can be a sheet metal material. The material can be a synthetic material. The synthetic material can have a filler. A hybrid construction can be avoided.

In summary, and stated in other words, the invention provides, among other things, a torsionally stiff guide rail of a double T-beam design.

Chain vibrations in the region between the pulleys (tight side, slack side) can be hindered from vibrating by the guide rails, which minimizes noise formation. One factor in this can be the rigidity of the guide rail tongues. Due to the available construction space, both on the inner side because of the disk geometry and on the outer side because of the housing, a form of the tongues can be severely restrictedly "specified."

Flexural rigidity/dimensional stability can be derived from the modulus of elasticity (E) and the area moment of inertia (I). An increase in the flexural rigidity can be achieved with an I-profile, possibly supported by additional transverse ribs orthogonal to longitudinal ribs and to the inner guide rail tongue. Through that geometric measure, it is possible, for example, to eliminate the use of additional elements, such as metal leaf springs.

The guide rail can have an I-profile (double T-beam). The longitudinal rib can be positioned in the direction of the tongue center. In addition, a tongue can be provided corresponding to a contour of the outer guide rail tongue/sliding surface corresponding to a maximum available outer contour. Transverse ribs, which are connected to both the first and the second outer ribs and serve to counteract twisting, can be provided on both sides of the longitudinal rib.

Exemplary embodiments of the present invention will be described in greater detail below in reference to the accompanying drawing figures. That description will provide additional features and advantages. Concrete features of the exemplary embodiments can depict general features of the invention. Features of the exemplary embodiments combined with other features can also represent individual features of the invention.

DESCRIPTION OF THE PREFERRED EMBODIMENTS

Figure 1:
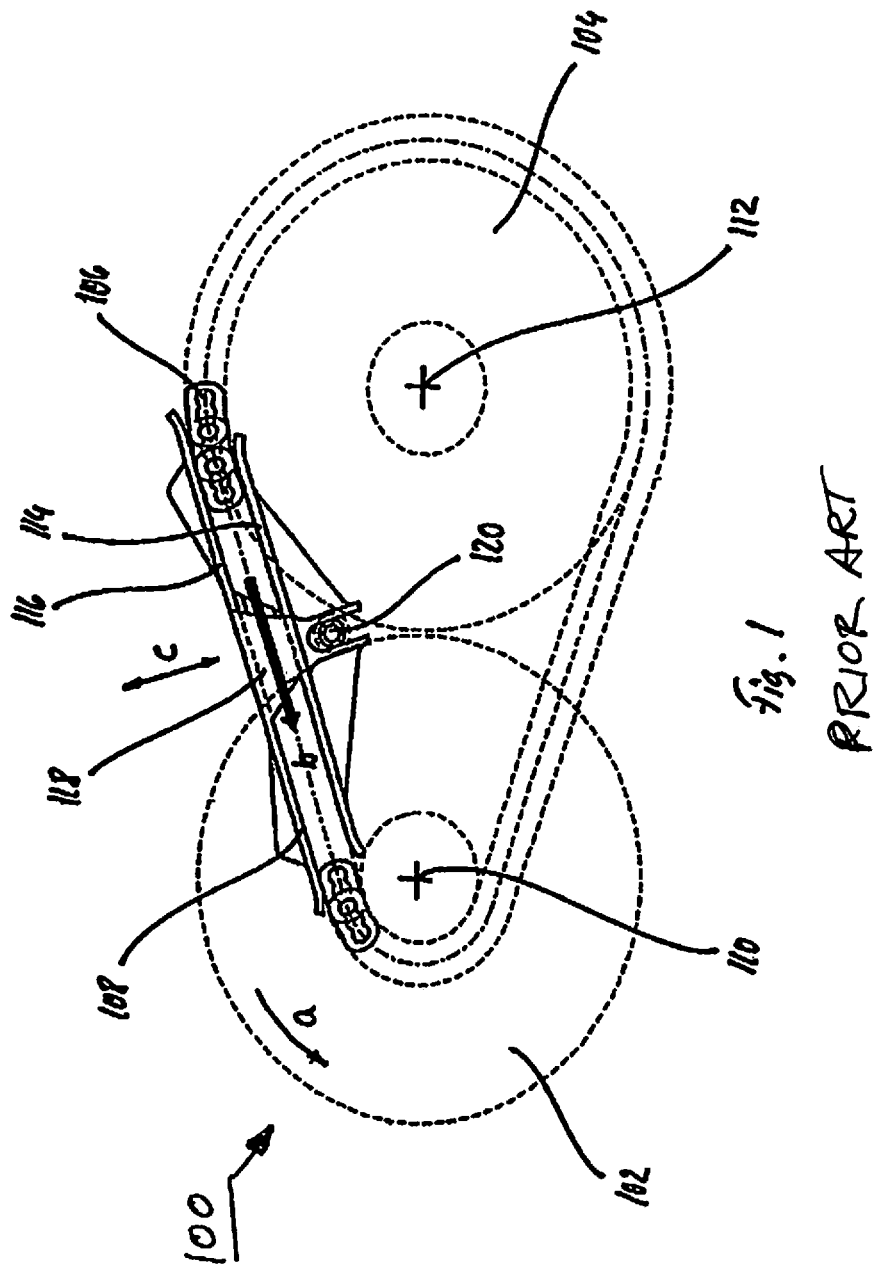
FIG. 1 is a side view of a continuously adjustable transmission having two conical pulleys, a chain, and a guide rail to guide the chain.

FIG. 1 shows a side view of a prior art continuously adjustable transmission 100 having two conical pulleys 102, 104, a chain 106, and a guide rail 108 to guide the chain 106.

The conical pulley 102 includes two conical disks and can be driven starting from a motor vehicle internal combustion engine. An axis of rotation of the conical pulley 102 is identified as 110. The direction of arrow a shows a direction of drive rotation. The conical pulley 104 can be suitably drive-connected to driving wheels of the motor vehicle. An axis of rotation of the conical pulley 104 is identified as 112.

The chain 106 serves to transmit mechanical power between the conical pulley 102 and the conical pulley 104. In the figure, the chain 106 runs on a small radius on the conical pulley 102 and on a large radius on the conical pulley 104. That results in a transmission ratio change of the transmission in the slower direction in the present case.

One of the conical disks of each of the conical pulleys 102, 104 can be moved in the direction of the respective axes of rotation 110, 112 relative to the respective other conical disk. If the conical disks of a conical pulley 102, 104 are far apart from each other, the chain 106 runs at a small radius of the associated conical pulley. If the conical disks of a conical pulley 102, 104 have a small distance between them, the chain 106 runs at a large radius of the associated conical pulley. If the distance between the conical disks is increased, the running radius of the chain 106 shifts in the direction of smaller radii. If the distance between the conical disks is decreased, the running radius of the chain 106 shifts in the direction of larger radii. The axially movable conical disks of the conical pulleys 102, 104 are adjusted in opposite directions, so that the chain 106 remains pre-tensioned. When the transmission ratio of the transmission 100 is changed, the relative position between the chain 106 and the axes 110, 112 of the conical pulleys 102, 104 changes.

With an input torque corresponding to the direction of arrow a, the chain 106 runs in the direction of arrow b along guide rail 108. The guide rail 108 is then positioned on a tight side of the chain 106. The guide rail 108 has an inner guiding section 114 and an outer guiding section 116. The guiding sections 114, 116 are connected to each other by connecting sections, such as 118. The chain 106 is guided between the guiding sections 114, 116 with only a small clearance. The guide rail 108 is positioned on a support tube 120. The support tube 120 is firmly positioned on a housing (not shown) of the transmission 100, and thus it is fixed in relation to the axes 110, 112 of the conical pulleys 102, 104. For the support of guide rail 108 on the support tube 120, the guide rail 108 has a receptacle in the form of a U-shaped opening.

During operation of the transmission 100, vibrations can be induced in chain 106 in a transverse direction to the chain movement direction, as shown by arrow c. The U-shaped opening of the receptacle of the guide rail 108 extends in the direction of arrow c. To enable a change in the position of the chain 106 relative to axes 110, 112 when the transmission ratio of the transmission 100 changes, the guide rail 108 is situated on the support tube 120 so that it can pivot around the longitudinal axis of the support tube 120, and so that it is movable in the direction of arrow c.

The guide rail 108 is composed of two guide rail halves. The two guide rail halves are fitted together in the direction of the axes of rotation 110, 112. A split plane of the guide rail 108 extends in the running direction of the chain 106 represented by arrow b, as well as in the transverse direction of arrow c.

Figure 2:
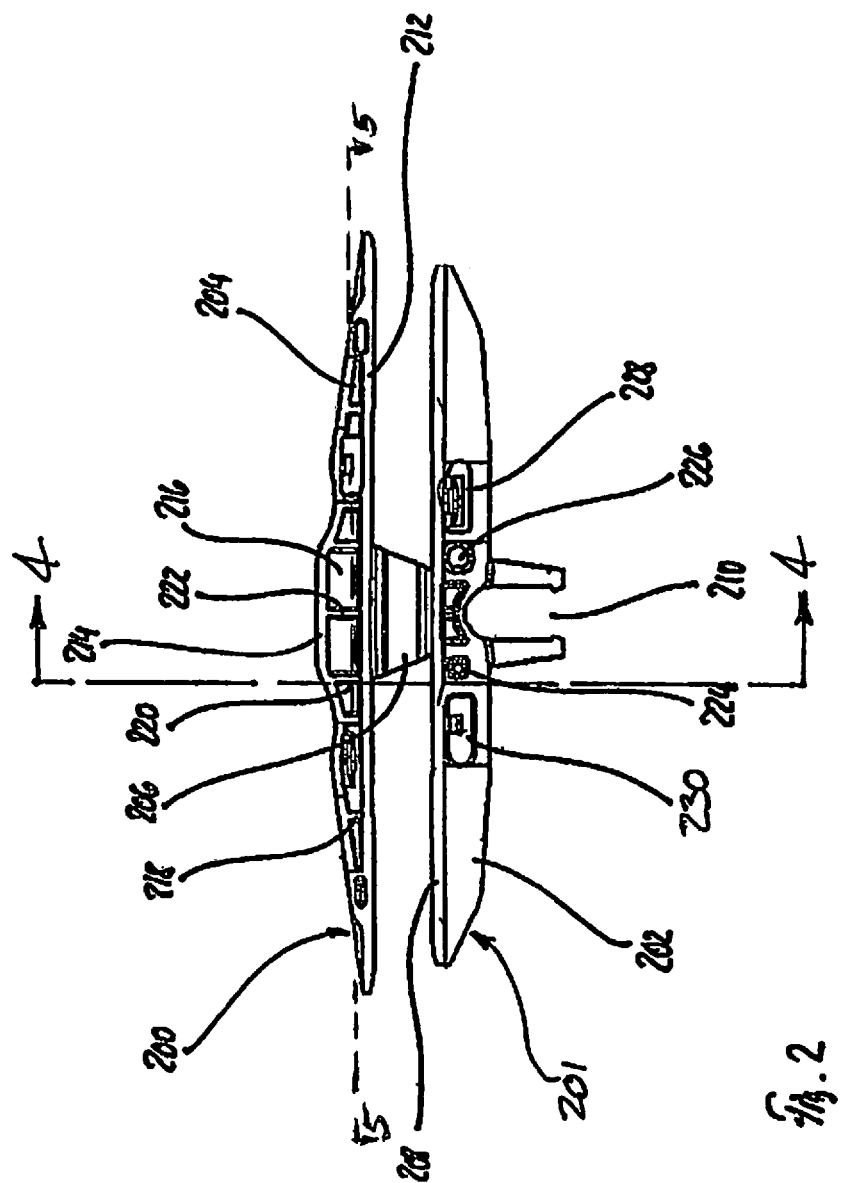
FIG. 2 is an inner, longitudinal side view of one guide rail half of a two-part guide rail, having two guiding sections and one connecting section, viewed in the inner direction of the guide rail.

FIG. 2 shows a guide rail half 200 of a two-part guide rail having two opposed, spaced guiding sections 202, 204 and a connecting section 206, as viewed from inside the guide rail. The guiding sections 202, 204 are kept apart from each other by the connecting section 206. The connecting section 206 is narrower at its end assigned to the guiding section 202 than at its end assigned to the guiding section 204. With its inner surface the connecting section 206 defines a lateral guide surface for the chain.

The guiding section 202 serves to guide the inner surfaces of a chain, such as chain 106 shown in FIG. 1. The guiding section 204 serves to guide the outer surfaces of the chain. The guiding section 202 has a sliding surface on tongue 208. A receptacle 210 for engagement with a support tube, such as support tube 120 shown in FIG. 1, is positioned on the guiding section 202. The guiding section 204 has a sliding surface on tongue 212. The sliding surface of tongue 208 of the guiding section 202 and the sliding surface of tongue 212 of the guiding section 204 are positioned parallel to each other. The guiding section 204 has an outer panel 214. The outer panel 214 and the sliding surface of tongue 212 are spaced from each other. The outer panel 214 is spaced farther apart from the sliding surface of tongue 212 in a middle section than at end sections of the guiding section 204. At the outer ends of guiding section 204, the outer panel 214 and the sliding surface of tongue 212 merge into each other. Otherwise the middle section of outer panel 214 and the sliding surface of tongue 212 are positioned parallel to each other.

Positioned between the sliding surface of tongue 212 and the outer panel 214 is a longitudinal rib 216. The longitudinal rib 216 extends between the outer end sections of the guiding section 204 and the outer panel 214. The longitudinal rib 216 is positioned at right angles to the sliding surface of tongue 208 and at right angles to the outer panel 214. Extending transversely to the longitudinal rib 216, the guiding section 204 has transverse ribs, such as ribs 218, 220, 222. The transverse ribs 218, 220, 222 are positioned between the sliding surface of tongue 212 and the outer panel 214.

The guide rail half 200 has a locating pin 224, a locating pin receptacle 226, a locking hook 228, and a locking bow 230 to allow guide rail half 200 to connect with a mating second guide rail half to form a complete guide rail. The guide rail half 200 is made in one piece. The guide rail half 200 is made of a synthetic material, for example a polyamide, possibly with a glass fiber filling. The guide rail half 200 is made in an injection molding process.

Figure 3:
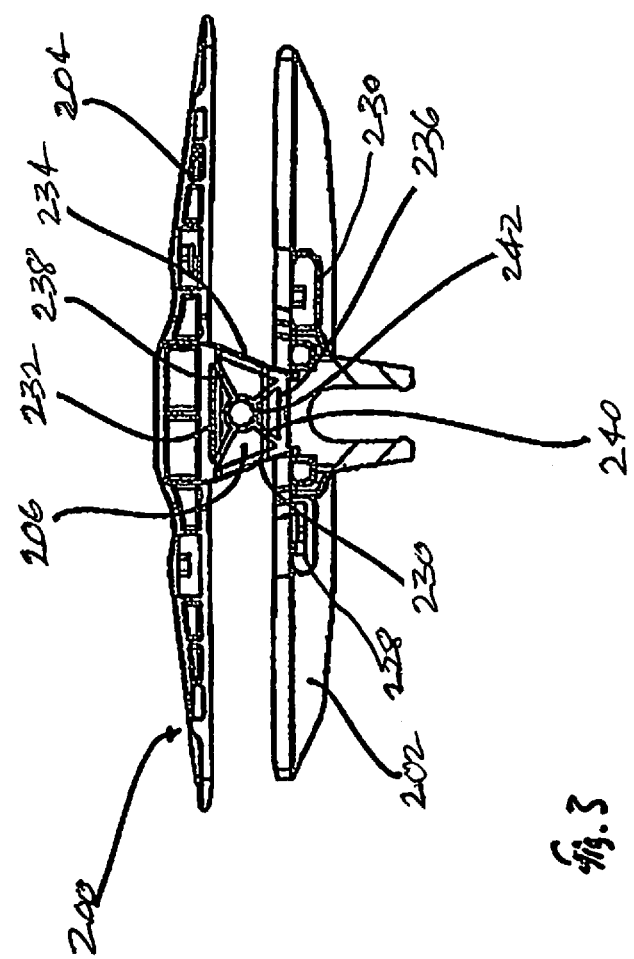
FIG. 3 is an outer, longitudinal side view of the guide rail half of the two-part guide rail shown in FIG. 2, partially in section, having two guiding sections and one connecting section.

FIG. 3 shows an outside view of guide rail half 200 of the two-part guide rail having two guiding sections 202, 204 and connecting section 206. On the outwardly-facing side the connecting section 206 has ribs 230, 232, 234, 236 running along its edge sections, as well as diagonally-running ribs 238, 240 and a ring-shaped rib 242. Otherwise see FIG. 2 and the associated description.

Figure 4:
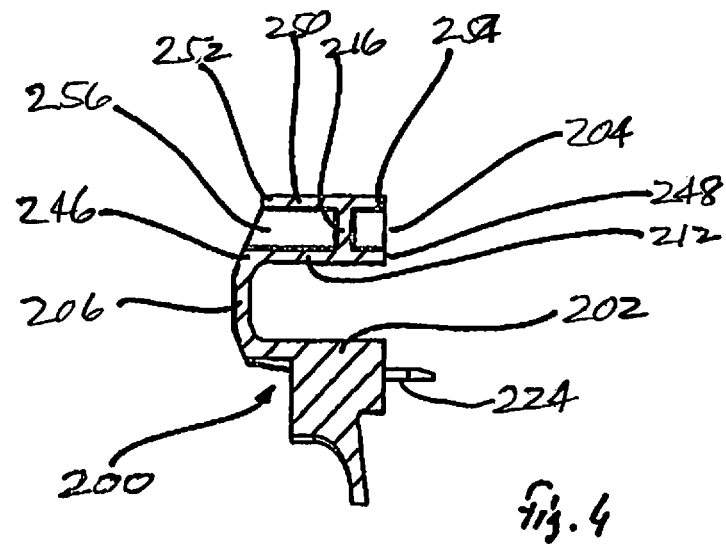
FIG. 4 is a transverse cross-sectional view taken along the line 4-4 of FIG. 2 of the guide rail half of the two-part guide rail having two guiding sections and one connecting section.

FIG. 4 shows a cross-sectional view of the guide rail half 200 of the two-part guide rail, taken along the line 4-4 of FIG. 2, having two spaced guiding sections 202, 204 and connecting section 206. The sliding surface of tongue 212 of the guiding section 204 has outer and inner edge sections 246, 248, respectively, which delimit the width of the sliding surface of tongue 212 in the transverse direction of the guide rail. The outer panel 250 of the guiding section 204 has outer and inner edge sections 254, 256, respectively, which delimit the width of outer panel 250 in the transverse direction of the guide rail. The longitudinal rib 216 is positioned between the edge sections 246, 248, 252, and 254, and lies inside those edge sections in the transverse direction of the guide rail half. The connecting section 206 connects the outer end of edge section 246 of guiding section 204 and the outer end of guiding section 202. A transverse rib 256 is visible in FIG. 4. The transverse rib 256 extends between the outer panel 250 and tongue 212 of guiding section 204 and the edge sections 248, 254 of guiding section 204. Otherwise see FIGS. 2 and 3 and the associated description.

Figure 5:
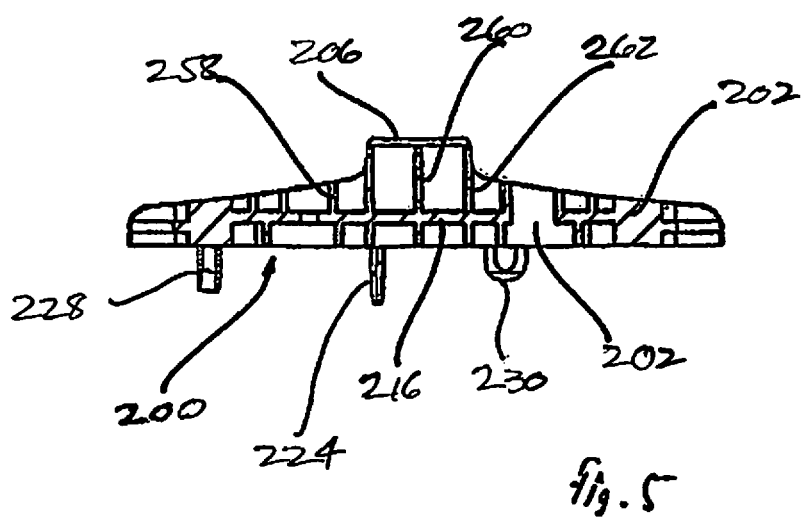
FIG. 5 is a longitudinal cross-sectional view taken along the line 5-5 of FIG. 2 of the guide rail half of the two-part guide rail having two guiding sections and one connecting section.

FIG. 5 shows a longitudinal cross section of guide rail half 200 of the two-part guide rail, taken along the line 5-5 of FIG. 2, the two-part guide rail having two opposed guiding sections and connecting section 206. Tongue 202 of guiding section 202 is visible in FIG. 5. The cut line of the sectional view shown in FIG. 5 runs through the longitudinal rib 216 and transverse ribs 258, 260, and 262. Also shown in FIG. 5 is locating pin 224, locking bow 230, and locking hook 228, each for engagement with associated connecting elements of the other half of the two-part guide rail, such as those shown in FIG. 2. Otherwise see FIGS. 2, 3, and 4 and the associated description.

What is claimed is:

1. A guiding device for a connecting belt of a belt-driven conical-pulley transmission, said guiding device comprising:
    a pair of guiding device halves that are connected with each other to define a first, upper guiding section having a first sliding surface, and a second, lower guiding section having a second sliding surface that is spaced from the first sliding surface of the first, upper guiding section and between which first and second sliding surfaces a connecting belt is guided in a running direction,
    wherein the respective sliding surfaces of the first and second guiding sections extend in a longitudinal direction corresponding to the running direction of the connecting belt, and also extend in a transverse direction perpendicular to the running direction of the connecting belt,
    wherein the first and second guiding sections are each connected to a connecting section that extends between the first, upper guiding section and the second, lower guiding section and includes an inwardly-facing surface which delimits the extent of the guiding sections and of the respective sliding surfaces in a direction transverse to the connecting belt running direction, the connecting section having an outwardly-facing surface spaced laterally outwardly from the inwardly-facing surface,
    wherein the guiding device includes at least one longitudinal rib that extends in the running direction of the connecting belt as the belt passes between the sliding surface of the first, upper guiding section and the sliding surface of the second, lower guiding section,
    a longitudinally extending outer panel that is spaced from and that overlies the sliding surface of the first, upper guiding section, wherein a middle region of the outer panel is spaced further from the sliding surface of the first, upper guiding section than it is spaced from that sliding surface at longitudinal end regions of the outer panel,
    wherein the longitudinal rib is spaced laterally outwardly from the outwardly-facing surface of the connecting section and is connected to and extends between each of the outer panel and the first, upper guiding section,
    wherein the outwardly-facing surface of the connecting section includes a plurality of outwardly-extending reinforcing ribs, and
    wherein the guide device halves are each formed from the same single material.

2. The guiding device according to claim 1, wherein the first, upper guiding section has a guide tongue and the outer panel is spaced above the guide tongue, and the longitudinal rib is positioned between and is connected to each of the guide tongue of the first, upper guiding section and the outer panel.

3. The guiding device according to claim 2, wherein the guide tongue, the outer panel, and the longitudinal rib form a double-T profile cross-section of the first, upper guiding section.

4. The guiding device according to claim 3, wherein the guide tongue, the outer panel, and the longitudinal rib are each of an at least approximately equal material thickness.

5. The guiding device according to claim 2, wherein the first, upper guiding section includes at least one transverse rib that extends between the first, upper sliding surface and the outer panel.

6. The guiding device according to claim 5, wherein the guide tongue, the outer panel, and the at least one transverse rib are each of an at least approximately equal material thickness.

7. The guiding device according to claim 2, wherein the first, upper guiding section includes a plurality of transverse ribs that extend between the first, upper sliding surface and the outer panel.

8. The guiding device according to claim 1, wherein the guiding device is made of a single material.

9. The guiding device according to claim 1, wherein the connecting section includes a plurality of external, outwardly-extending reinforcing ribs extending in the longitudinal direction of the guiding sections at an upper position of the connecting section opposite the first, upper guiding section, relative to an upper surface of the connecting belt, and at a lower position of the connecting section opposite a lower guiding section, relative to a lower surface of the connecting belt.

10. The guiding device according to claim 1, wherein the reinforcing ribs include a longitudinally-extending reinforcing rib extending along each longitudinally spaced, upper and lower outer end surface of the connecting section.

11. The guiding device according to claim 1,
    wherein the connecting section includes external reinforcing ribs extending in the longitudinal direction of the guiding sections at an upper position of the connecting section opposite an upper guiding section, relative to an upper surface of the connecting belt, and at a lower position of the connecting section opposite a lower guiding section, relative a lower surface of the connecting belt; and
    wherein the reinforcing ribs of the connecting section include a longitudinally-extending reinforcing rib extending along each longitudinally extending upper and lower end surface of the connecting section.

12. The guiding device according to claim 11, wherein the connecting section includes a pair of external, diagonally-extending reinforcing ribs, each of which extends between a respective upper outer end surface of the connecting section and a respective lower outer end surface of the connecting section.

13. The guiding device according to claim 1, wherein the connecting section includes a pair of external, diagonally-extending reinforcing ribs, each of which extends between a respective upper outer end surface of the connecting section and a respective lower outer end surface of the connecting section.

* * * * *